April 2, 1963 S. B. HEPPENSTALL, JR 3,083,454
INTEGRAL PIPE AND FITTINGS
Filed May 22, 1959 3 Sheets-Sheet 1

INVENTOR.
Samuel B. Heppenstall, Jr.
BY
HIS ATTORNEYS

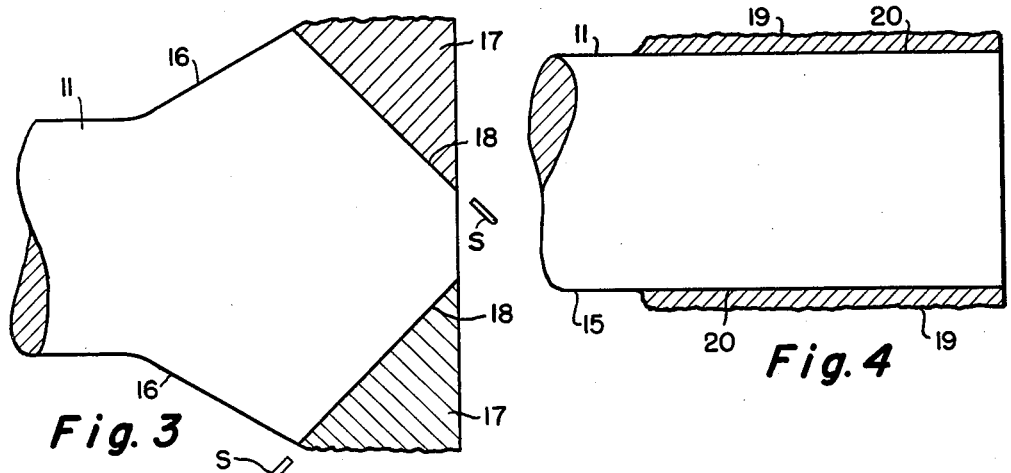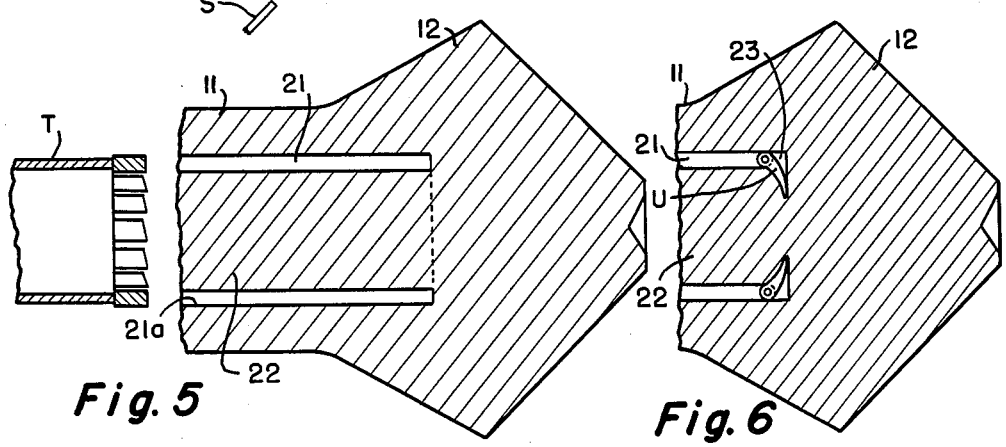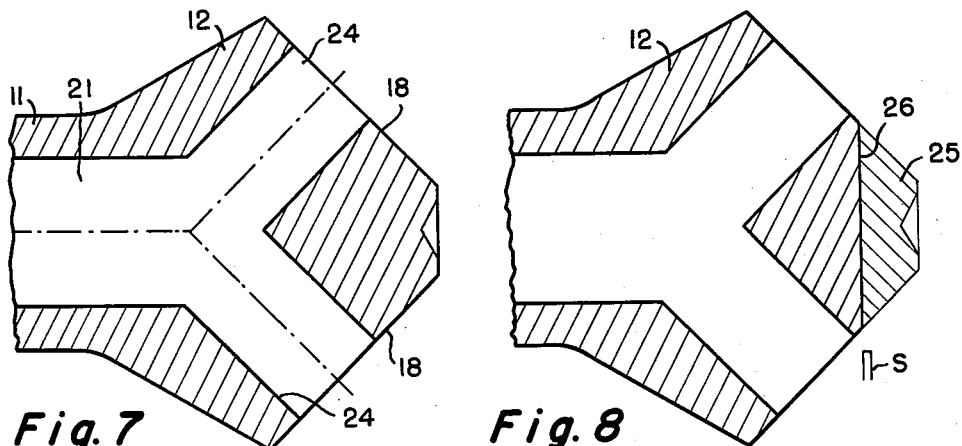

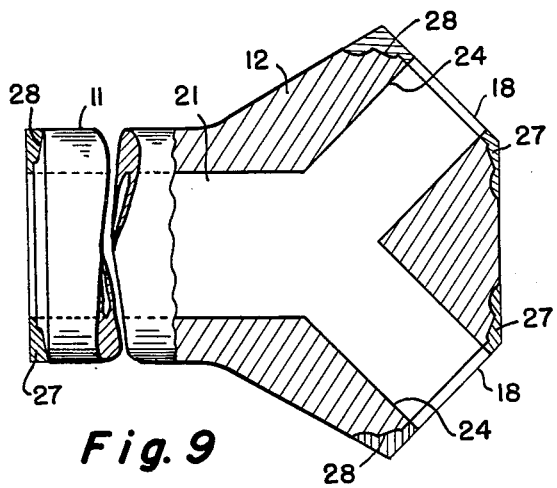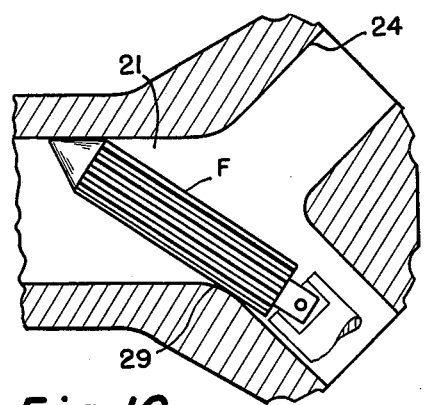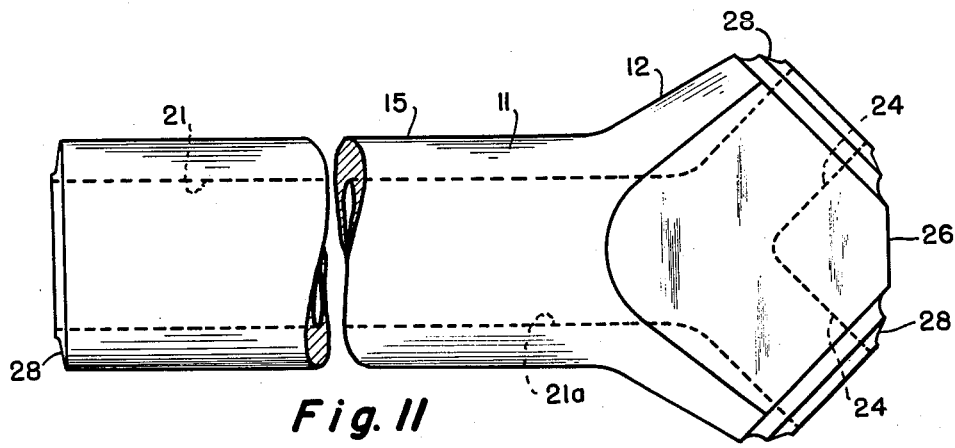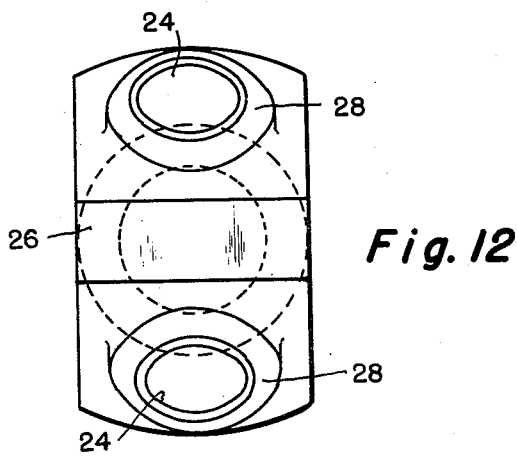

United States Patent Office 3,083,454
Patented Apr. 2, 1963

3,083,454
INTEGRAL PIPE AND FITTINGS
Samuel B. Heppenstall, Jr., 1223 Herberton Ave.,
Pittsburgh 6, Pa.
Filed May 22, 1959, Ser. No. 815,130
7 Claims. (Cl. 29—556)

This invention relates to pipe members having fittings formed integral therewith, and more particularly, to an improved method for forming fittings integral with elongated pipe members.

In the past, it has been customary to forge steam line members and their fittings separately and then weld the fittings to the line members. Since steam lines may have an outside diameter of approximately 2 feet or better, with extensive wall thicknesses to withstand high pressure heads, the process of welding a fitting to the steam pipe is an expensive operation and may run into thousands of dollars. In addition, the welding operation re-crystallizes the metal adjacent the connected portions of the pipe and the fitting, and together with the welding bead, provides an area of different physical characteristics with respect to the remaining portion of the pipe. This area has detrimental effects with regard to the strength, ductility, and overall thermal expansion of the pipe member.

It thus has been an object of my invention to provide a pipe member having a fitting formed integral therewith;

A further object of my invention has been to form a pipe fitting integrally with a pipe member wherein uniform physical properties exist throughout the fitting and the pipe member;

A further object of my invention has been to provide an improved method of producing a pipe member with a fitting formed integral thereon;

These and other objects of my invention will be apparent to those skilled in the art from the following disclosure and accompanying drawings in which:

FIGURE 3 illustrates a cutting operation along the knobular portion;

FIGURE 4 illustrates a milling operation to form a surface of the knobular portion continuous with the outside diameter of the longitudinally-extending portion;

FIGURE 5 illustrates a trepanning operation;

FIGURE 6 illustrates an undercutting operation;

FIGURE 7 illustrates a boring operation;

FIGURE 8 illustrates a cutting operation on a surface of the knobular portion;

FIGURE 9 illustrates a finishing operation;

FIGURE 10 illustrates a further finishing operation which may be utilized in the production of my integral fittings;

FIGURE 11 is a plan view of a completed pipe member having a fitting formed integrally thereon made in accordance with my invention; and, FIGURE 12 is an end view in elevation of the right-hand end of the member shown in FIGURE 11, showing a Y-fitting formed on the elongated pipe member.

Figure 1:
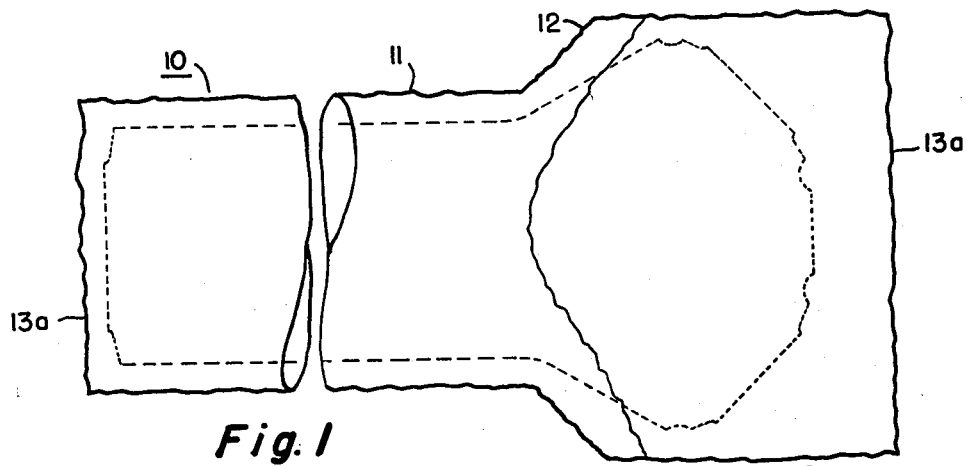
FIGURE 1 illustrates a longitudinally-extending forging having a knobular portion or head fitting.
Figure 1A:
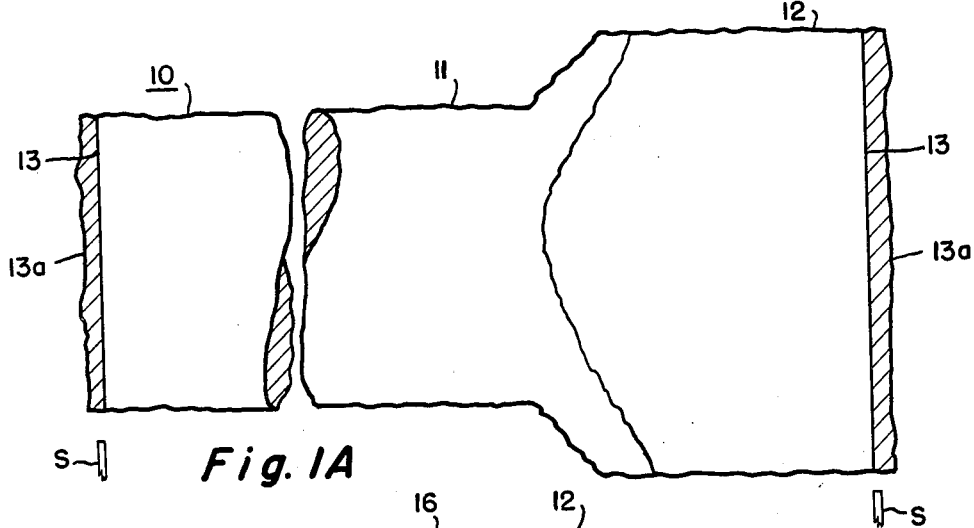
FIGURE 1A shows a cutting operation along end surfaces of the forging.

Referring now to the drawings, a solid, longitudinally-extending preliminary shape 10 is forged with an elongated or longitudinally-extending portion 11; and expanded, bulbous or knobular portion, head or projection 12 is formed integrally therewith. As shown in FIGURE 1A, rough end portions 13a may be removed from the forging to provide smooth surfaces 13 for facilitating the turning of centers. It is not necessary to remove the portions 13a when the end portions are moderately smooth, however, the removal of rough end portions, such as by means of saw blade S, is a matter of convenience for providing turning centers.

Figure 2:
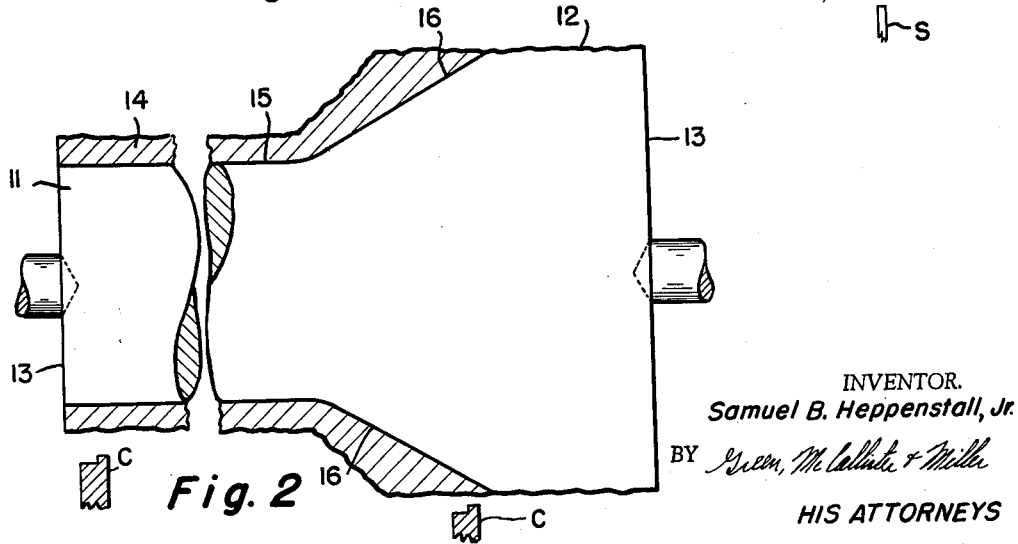
FIGURE 2 illustrates a machining operation along a longitudinally-extending portion of the forging and about a surface of the kobular portion.

The longitudinally-extending portion 11 may be then machined to a desired outside diameter by the removal of excess material 14 to form a finished surface 15 of the desired outside diameter. In addition, a surface of the knobular portion 12 is also machined to size, such as tapered surface 16 that has a variable outer diameter. The machining operations may be performed by blades C (see FIGURE 2).

Excess material 17 is then shown removed from the knobular portion 12, as by cutting-off the excess material with saw blades S, to leave a smooth or planar surface 18 along each cut. As shown in FIGURE 3, angular or diagonal cuts are made which, in effect, form angular or Y-ends on the knobular fitting portion 12.

A pair of opposed surfaces 19 of the knobular portion 12 may then be flattened to form flat surfaces 20, each of which is continuous with a portion of the outside diameter 15 of the longitudinally-extending portion 11. As shown in FIGURE 4, the flattening process reduces the thickness of the knobular portion 12 to a thickness equal to the outside diameter of portion 11. Such process may be performed by any suitable milling operation, such as slab milling. It will be apparent, of course, that when certain fittings, such as T's and bull heads are formed integral with a longitudinally-extending pipe member, it is unnecessary and inadvisable to slab mill opposed sides of the knobular portion; they may be machined eccentrically during the surface machining operation of knobular portion 12, so that a connecting side surface therebetween will be continuous with and tangential to a portion of the outside diameter 15 of longitudinally-extending portion 11 that is to constitute the body of the pipe member.

The longitudinally-extending portion 11 is then axially trepanned to form a passageway 21 having a desired interior diameter, represented by inner surface 21a (see FIGURE 5). The operation is performed by a trepanning cutter, such as T, which leaves a core 22 within the longitudinally-extending portion 11. When forming a Y-fitting, the core is attached at one end to the knobular portion 12, and the end of the trepanned core may then be undercut, as shown at 23 in FIGURE 6, to facilitate its removal. However, when the bores to be formed in a head end are of sufficient magnitude, they will free the core 22 from the knobular portion 12, and it is unnecessary to perform the undercutting operation. The undercutting may be performed by any suitable undercutting tool such as U.

The knobular portion 12 is then bored through each surface 18 to form a bore or passageway 24 therein which communicates with the passageway 21 of the longitudinally-extending portion. As shown in FIGURE 7, the axis of the bore 24 angularly intersects the axis of passageway 21. When forming a Y-fitting, the communication of the bores 24 with the passageway 21 separates the core 22 from the portion 12, and permits the removal of the core. A turning center 25 may then be removed, as by a saw cut to provide a smooth end 26 (see FIGURE 8).

Welding necks 28 are then formed about the ends of passageways 24 and 21 by a finishing operation which removes excess material 27 (see FIGURE 9). The intersection of bores 24 and inner surface 21 may then be rounded, as at portions 29, by means of a suitable hand tool or a flute F, as shown in FIGURE 10.

Although I have particularly illustrated my invention with respect to a Y-fitting formed integrally on the end of a longitudinally-extending pipe member, it is to be understood, of course, that other fittings, including T's, laterals, and bull heads may accordingly be formed integrally along the extent of a longitudinally-extending member without departing from the spirit and scope of the invention as defined in the appended claims.

I claim:

1. A method of forming a unitary body having a fitting integral with an extended pipe member wherein the pipe member comprises a major portion of the body, which comprises the steps of forming a solid longitudinally-extending member with an expanded portion, machining the outside diameter of said longitudinally-extending member and at least one surface of said expanded portion to size, removing excess material adjacent said expanded portion, trepanning said longitudinally-extending member to form a pipe member having a desired inside diameter, and boring at least one passageway through said expanded portion to angularly communicate with said trepanned portion.

2. A process for forming a longitudinally-extending integral pipe and fitting member having an extended tubular main body portion with a fitting formed integral therewith comprising the steps of, forging a unitary member having a longitudinally-extending portion and bulbous portion, machining the outside diameter of said longitudinally-extending portion and at least one surface of said bulbous portion to size, removing excess material from said bulbous portion to form at least one planar face thereon, trepanning said longitudinally-extending portion to form a pipe member with a desired inside diameter, and boring through said planar face of said bulbous portion to intersect with said trepanned portion.

3. A method of forming a unitary body having a fitting integral with an extended pipe member wherein the pipe member comprises a major portion of the body, which method comprises the steps of, forging an elongated member with a knobular portion, machining the outside diameter of said elongated member and at least one surface of said knobular portion to size, removing excess material adjacent at least one side of said knobular portion to form a planar surface, forming at least one face on said knobular portion continuous with a portion of the outside diameter of said elongated member, boring said elongated member with a trepanning cutter to form a hollow pipe with a desired inner diameter, boring at least one passageway through the planar surface of said knobular portion to communicate with said trepanned portion, and removing the core formed by the trepanning cutter to thus form communicating passageways between a fitting integral with a hollow pipe member.

4. A method of forming a unitary body member having a Y-fitting formed integrally on an elongated pipe member wherein the pipe member comprises a major portion of the unitary body comprising the steps of, forging a solid longitudinally-extending member having an outwardly-expanded portion, machining the outside diameter of said longitudinally-extending member and a tapered diameter on the outwardly-expanded portion to size, removing excess stock material from outer end portions of said expanded portion by making angular cuts along the expanded portion to form Y-ends, milling opposed flat faces on the expanded portion to a thickness equal to the outside diameter of the longitudinally-extending member, boring said longitudinally-extending member with a trepanning cutter to form a desired inside diameter, forming a passageway in each of the Y-ends to angularly communicate with the trepanned portion of the longitudinally-extending member and to free the core formed by the trepanning cutter, and removing the core formed by the trepanning cutter.

5. A method of forming a unitary body having a Y-fitting formed integrally with an end of a longitudinally-extending pipe member wherein the pipe member comprises a major portion of the body; the method comprising, forging a unitary body member having a longitudinally-extending portion and a knobular end portion, machining the outside diameter of the longitudinally-extending portion and a tapered diameter on the knobular portion to size, angularly cutting excess material from opposed sides and an end of the knobular portion to form Y-ends, flattening opposed faces of the knobular end portion to a thickness equal to the outside diameter of the longitudinally-extending portion, trepanning the longitudinally-extending portion to a desired inside diameter, boring a hole in each of the Y-ends to angularly intersect the trepanned portion, and finishing off welding necks on the Y-ends.

6. A method of forming a Y-fitting integral with an extended pipe member comprising, forging a solid member having a longitudinally-extending portion and a bulbous portion at one end, machining the outside diameter of the longitudinally-extending portion to size and forming a tapered diameter on the bulbous portion, making two angular cuts adjacent the outer end of the bulbous portion to form Y-end surfaces, slab milling opposed flat faces on the bulbous portion to a thickness equal to the outside diameter of the longitudinally-extending portion, boring the longitudinally-extending portion with a trepanning cutter to form a pipe member having a desired inside diameter, undercutting the end of the core formed by the trepanning operation, boring a hole in each of the Y-end surfaces to angularly communicate with the trepanned portion of the longitudinally-extending portion and to free the core formed by the trepanning cutter, removing the core formed by the trepanning operation, removing a finishing center between the Y-end surfaces, and finishing the Y-end surfaces to form welding necks, thus forming a pipe member having an integral Y-fitting at one end thereof.

7. A method of forming a unitary body having a fitting integral with an extended pipe member wherein the pipe member comprises a major portion of the body, the method comprising the steps of, forging an elongated member with a knobular portion, machining the outside diameter of said elongated member and at least one surface of said knobular portion to size, removing excess material adjacent at least one side of said knobular portion to form a planar surface, forming at least one face on said knobular portion continuous with a portion of the outside diameter of said elongated member, boring said elongated member with a trepanning cutter to form a hollow pipe with a desired inner diameter, boring at least one passageway through the planar surface of said knobular portion to communicate with said trepanned portion and to free the core formed by the trepanning cutter, and removing the core formed by the trepanning cutter to thus form communicating passageways between a fitting integral with a hollow pipe member.

References Cited in the file of this patent

UNITED STATES PATENTS

| | | |
|---|---|---|
| 650,964 | Billings | June 5, 1900 |
| 1,226,689 | Nedoma | May 22, 1917 |
| 2,057,669 | Brauchler | Oct. 20, 1936 |
| 2,222,629 | Parker | Nov. 26, 1940 |
| 2,533,720 | Danel | Dec. 12, 1950 |
| 2,762,635 | Lorber | Sept. 11, 1956 |
| 2,870,838 | Aston | Jan. 27, 1959 |

FOREIGN PATENTS

| | | |
|---|---|---|
| 746,052 | Great Britain | Mar. 7, 1956 |